April 19, 1960  C. J. HOLTKAMP  2,933,585
CONTROL SYSTEM FOR A ROASTING OVEN
Filed Jan. 16, 1958
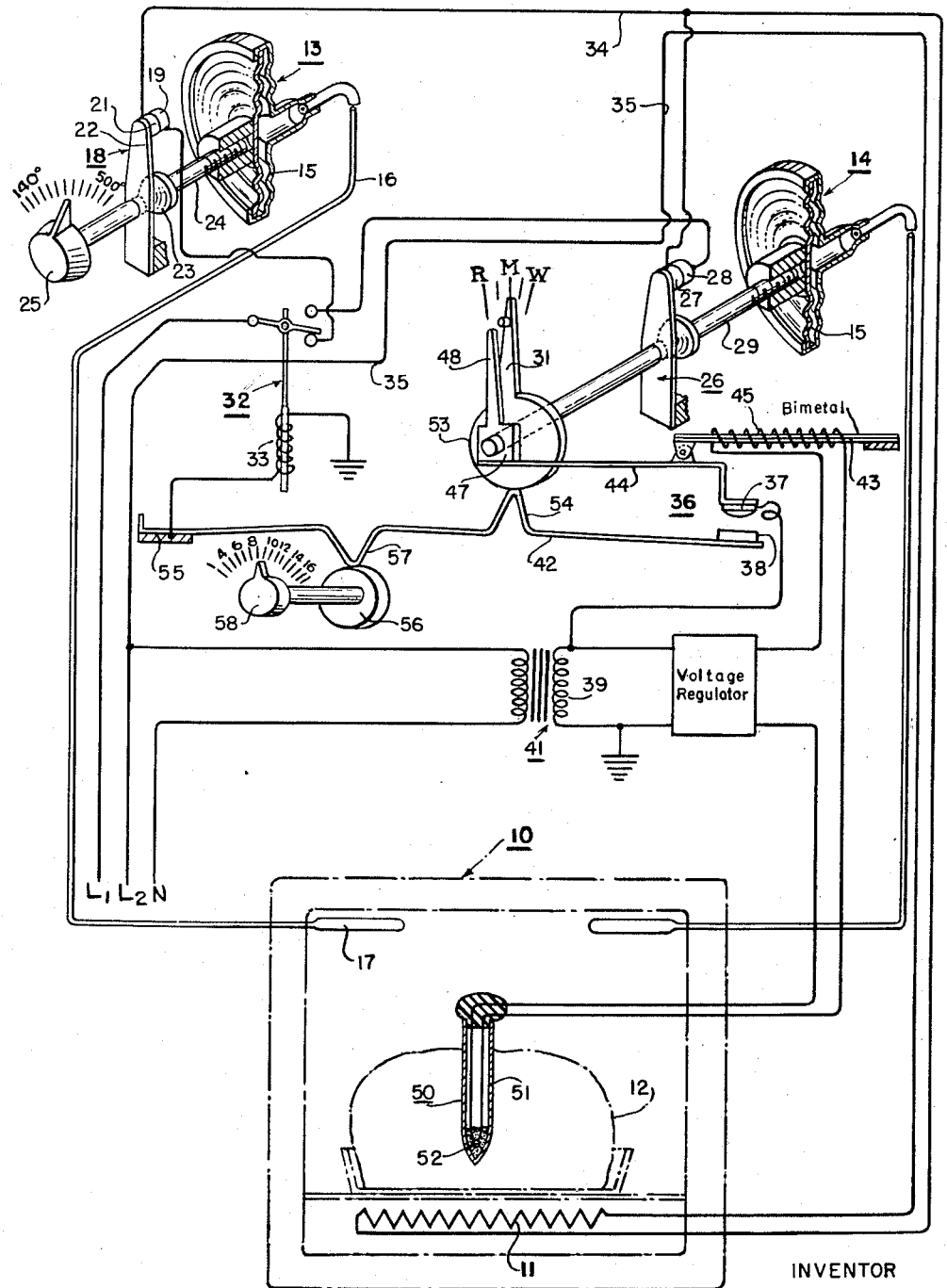
INVENTOR
CALVIN J. HOLTKAMP
BY Raymond J. Ridge
ATTORNEY

United States Patent Office 2,933,585
Patented Apr. 19, 1960

2,933,585

CONTROL SYSTEM FOR A ROASTING OVEN

Calvin J. Holtkamp, Mansfield, Ohio, assignor to Westinghouse Electric Corporation, East Pittsburgh, Pa., a corporation of Pennsylvania Application January 16, 1958, Serial No. 709,413

9 Claims. (Cl. 219—20)

This invention relates to a control system for an oven adapted for the roasting of meat and has for an object to provide an improved control system of this kind.

The invention is directed particularly to an oven control generally of the class disclosed in my copending application Serial No. 689,627, filed October 11, 1957, wherein a body of meat is first subjected to a controlled, relatively high temperature in a conventional manner and subsequently maintained at a lower mean temperature following the elevation of the temperature of an inner region of the meat to a predetermined value selected by the operator; which value is a function of the desired degree of "doneness" of the roast. The term "doneness" is used for convenience throughout this specification as that condition of a roast of meat usually referred to as rare, medium and well done. It is another object of this invention to provide an improved control system of the class set forth.

In accordance with one embodiment of the present invention, a thermostatic switching means is employed for controlling the oven heater during the first stage of the roasting operation which is carried out at the usual high mean oven temperature of the order of 325° F. Means including a temperature responsive probe inserted in an inner region of the body of meat, transfers control of the oven heater from the high temperature thermostatic switching means to an adjustable, lower temperature thermostatic switching means that controls the oven temperature at a selected value during the final cooking stage. This selected temperature value is a function of the degree of doneness desired and is, for example, of the order of 140° F. for rare roasts and 180° F. for well done roasts. In a control system of this kind, where the control of oven temperature passes abruptly from the high temperature thermostatic switching means to the lower temperature thermostatic switching means, a period of temperature recession occurs after the inactivation of the higher temperature thermostatic means, during which, cooking of the meat continues. It has been found that the rate of cooking during this period varies materially with different weights of meat so that uniform doneness of the meat is not obtained for the different sizes of roasts.

Accordingly, it is a primary object of the invention to compensate for the weight of the body of meat to be roasted when the probe temperature is selected at which transfer of control of the oven heater to the lower temperature thermostatic switching means is effected.

A further object of this invention is to provide a simplified control of the class set forth wherein certain control elements such as, cycling bimetals and auxiliary control heaters for the primary thermostatic switches are obviated.

The foregoing and other objects are effected by the invention as will be apparent from the following description and claims taken in connection with the accompanying drawings, forming a part of this application, in which:

The single figure of the drawing illustrates diagrammatically an oven control system constructed and arranged in accordance with the invention.

Referring now to the drawing, the invention in one form is disclosed applied to a conventional, heat insulated oven 10 having an electric heater 11 and a suitable supporting tray for material to be cooked such as, for example, a body of meat to be roasted and indicated at 12. The source of energy for the heater 11 is represented by the high voltage line conductors L–1 and L–2 of an Edison three-wire circuit which also includes a neutral conductor N. Energization of the heater 11 is controlled by thermostatically operated switches 13 and 14 which are selectively rendered active, as described hereinafter. The thermostatically operated switches may be of any suitable construction but are preferably of the hydraulic or solid fluid type.

The thermostat 13 includes a hollow expansible wafer 15 communicating, by means of a relatively small diameter tube 16, with a bulb or reservoir 17 disposed within the oven. As is understood, the wafer 15, tube 16 and bulb 17 are completely filled with an expansible liquid whose volume changes directly with changes in temperature at the bulb. The thermostat 13 includes a switch 18 having a fixed contact 19 and a movable contact 21, the latter being supported by a spring arm 22 that biases the contact 21 toward the contact 19 at all times. Movement of the expansible wafer 15 is imparted to the contact arm 22 by means of a shoulder 23 formed on a stem 24, the latter being threaded to the wafer 15 as shown. As is understood, expansion of liquid in the bulb 17 due to an increase in bulb temperature forces the shoulder 23 to the left for separating the contacts 21 and 19. Conversely, as the liquid in the bulb cools and contracts, the shoulder 23 moves to the right so that the bias of the arm 22 effects closure of the switch 18. The temperatures at which the switch 18 is opened and closed may be varied by rotating the threaded stem 24 and, therefore, changing the position of the shoulder 23 relative the switch arm 22, all of which is well understood. As shown, the stem 24 is provided with a knob 25 for rotating the threaded stem 24 and changing the temperature setting of the thermostat. The knob 25 serves as a pointer that cooperates with indicia representing oven temperature in degrees Fahrenheit.

The other thermostat 14 is a substantial duplicate of the thermostat 13 and includes a switch 26 having respective movable and fixed contacts 27 and 28. The thermostat 14 has an adjusting stem 29 that is actuated by a manually operated handle 31 fixed to the stem 29. The handle 31 cooperates with indicia R, M and W representing, respectively, "Rare," "Medium" and "Well Done" conditions for meat being roasted in the oven and may be referred to as the doneness control handle. It is to be understood that, when the handle 31 is in the "Rare" position, the thermostat 14 cycles its switch 26 to maintain a relatively low mean oven temperature, and that the mean temperature is increased as the handle 31 is adjusted toward its "Well Done" position. Since the construction and operation of hydraulic thermostats of the class shown at 13 and 14 are so well understood, further description of the same is deemed unnecessary.

As set forth in detail hereinafter, control of the oven heater 11 is transferred from the thermostat 13 to the thermostat 14 during a roasting operation. The roasting of the meat during the early stage is under the control of the thermostat 13 which is usually adjusted to provide a conventional roasting temperature in the oven of approximately 350° F. When the temperature of an inner region of the roast attains a predetermined temperature determined by the setting of the doneness control handle 31, control of the heater 11 is transferred to the thermostat 14 which maintains a lower temperature within the oven as determined by the control handle 31. Further reference to this operation is made hereinafter. The means for transferring control, as described, includes a double throw relay 32 having an operating coil 33. It will be understood that, when the relay 32 is deenergized, its movable contact engages the lower fixed contact as shown in the drawing and, when the relay 32 is energized, its movable contact engages the upper fixed contact. The conductors for energizing the main heater 11 are indicated at 34 and 35, the conductor 35 being directly connected to the line conductor L-2. When the relay 32 is deenergized, the line conductor L-1 is connected thereby through the switch 18 to the heater conductor 34. The thermostat 13 is, therefore, controlling at this time. When the relay 32 is energized, the line conductor L-1 is connected to the heater conductor 34 through the switch 26 so that the thermostat 14 is rendered active to control the heater 11 at this time.

In accordance with the invention, energization of the relay coil 33 is controlled by a transfer switch 36 having relatively movable contacts 37 and 38. Preferably, a low voltage source of energy, such as the secondary 39 of a low voltage transformer 41, is employed for the coil 33, one terminal of the secondary 39 being connected to the contact 37 and the other terminal being grounded, as shown. The primary of the transformer 41 may be connected directly across the line conductor L-2 and the neutral conductor N of the main power source. The contact 38 is carried by a flexible spring arm 42 that is electrically connected to one terminal of the coil 33, the other coil terminal being grounded, as shown. When the transfer switch 36 is open, as shown, the relay 32 is deenergized for the activation of thermostat 13. Closing of the transfer switch 36 energizes the relay 32 so that the thermostat 13 is inactivated and the thermostat 14 rendered active for the control of the main heater 11.

The actuation and adjustment of the transfer switch 36 will now be described. The contact 37 is actuated by a bimetal element 43 fixed at one end and suitably pivoted to a support arm 44 for the contact 37 at its other or free end. A control heater 45 is disposed in intimate heat transfer relation with the bimetal element 43; the latter, when heated, deflecting downwardly to move the contact 37 toward the contact 38. Preferably, ambient temperature conpensation is provided for the bimetal 43 in any conventional manner. The arm 44 is fixed to a hub 47 of a pointer 48, which hub 47 is freely movable about an extension of the stem 29. Accordingly, the contact 37 is swung downwardly and upwardly about the stem 29 in response to the respective heating and cooling of the bimetal 43. The pointer 48 cooperates with the indicia R, M and W and serves as an indicator of the heating of the meat.

Deflection of the bimetal 43 and movement of the contact 37, as well as the pointer 48, are responsive to the temperature of an inner region of the roast 12 and, to this end, a temperature responsive probe 50 which may be readily inserted in the meat is employed. The probe may include a pointed shell 51 of good heat conducting material, within the pointed end of which, a resistor 52 is disposed in intimate heat transfer relationship with the shell. Preferably, the resistor 52 has negative resistance-temperature characteristics such that, the resistance of the resistor decreases with increases in temperature and vice versa. The shell 51 is closed by an insulating cap through which the leads for the resistor 52 extend. It will be noted that the resistor 52 is in a series circuit with the heater 45, which circuit is energized by the low voltage secondary 39 of the transformer. Preferably, a voltage regulator of any suitable construction is connected to the secondary 39 in order to impress a substantially constant voltage on the series circuit of the heater 45 and resistor 52, regardless of voltage fluctuations in the transformer secondary. From the foregoing, it will be noted that the temperature of the bimetal 43 is a function of the temperature of the roast and the resistor 52, so that the amount of deflection of the bimetal 43 closely follows temperature changes of the roast.

The spacing of the contacts 37 and 38 determines the temperature of the probe 50 at which the transfer switch 36 is closed to transfer control of the heater 11 from thermostat 13 to thermostat 14. The contact 38 is adjusted relative the contact 37 by a cam 53 formed on the doneness control handle 31 and engaged at all times because of the bias of the spring arm 42, with a follower 54 embossed in the spring arm 42. The end of the arm 42 opposite the end carrying the contact 38 is fixed, as shown at 55, and the free end of the arm 42 and its contact 38 are positioned in a manner to be referred to hereinafter. It will be noted here that the temperature of the oven provided by the thermostat 14 is somewhat higher than the temperature of the probe 50 at which contacts 37 and 38 are closed to transfer control from thermostat 13 to thermostat 14, primarily because of the cooling effect of liquid evaporation from the roast. Also, it should be noted that cooking of the roast is continued by stored heat and with receding temperature for a substantial period of time, which may be of the order of an hour, following the inactivation of the thermostat 13 and before the closing of contacts 27 and 28 of thermostat 14. It has been found that the rate or amount of cooking during this period with stored heat varies substantially with different size roasts so that they are not uniform as to doneness when control passes to thermostat 14 for the maintenance of the doneness temperature. An example of this operation of the control system, as described up to the present, follows.

Let it be assumed that a three pound roast of meat and a fifteen pound roast are placed in separate identical ovens and that the respective thermostats 14 are each adjusted to the "Rare" setting for providing an oven temperature of 140° F. Let it be further assumed that, with this setting, the contacts 37 and 38 close at a temperature of 90° F. at the probe 50 to cause the relay to transfer control from thermostat 13 to thermostat 14. When the internal temperature of each roast is elevated to 90° F., the thermostats 13 are inactivated and the temperature within the ovens decreases from the 325° F. maintained by the thermostats 13 to the mean temperature of 140° F. maintained by the thermostats 14. During this period of receding temperatures, roasting of the meat continues. It will be found that the three pound roast will be properly cooked to a rare condition at 140° F. but the larger fifteen pound roast will not increase in temperature above 100° F., which is quite raw. In order to cook the larger roast, the temperature recession should not have been initiated until the temperature of the center of the roast had been elevated to approximately 135° F. If, in the example just described, the control had been designed to close the contacts 37 and 38 at 135° F. instead of the 90° F., the larger roast would have been cooked to the proper 140° F. rare temperature but the smaller roast would have been overcooked and would have attained a well done temperature of 185° F. at the conclusion of the period of cooking at receding temperature.

In accordance with this invention, the non-uniform degrees of doneness of different size roasts is obviated. Compensation for the weight of the meat is provided, and is carried out by adjusting the spacing of contacts 37 and 38 that is provided by the doneness control handle 31. A second cam 56 is provided engaging a second follower 57 formed on the spring arm 42. The cam 56 and follower 57 are maintained in engagement at all times and effect different degrees of bowing in the portion of the arm 42 intermediate its fixed end 55 and the follower 54. Adjustment of the cam 56 is afforded by a knob 58 that serves as a pointer cooperating with indicia representing weight of the meat being treated. It will be noted that, as the cam 56 and knob 58 are moved clockwise in the direction of increased roast sizes, the follower 57 is moved upwardly, increasing the bowing of the arm 42 so that the contact 38 is moved downwardly, increasing its spacing from the contact 37 and, therefore, increasing the temperature of the interior of the meat at the probe, at which control passes from thermostat 13 to thermostat 14. Movement of the knob 58 in the direction of smaller weights of roasts reduces the spacing of contacts 37 and 38 and, therefore, the temperature of the interior of the roast at which control passes from thermostat 13 to thermostat 14 is reduced.

From the foregoing description, it will be apparent that, following a period of cooking at the usual, relatively high, mean temperature of the order of 350° F. provided by thermostat 13, the meat is subjected to a period of receding temperature, during which cooking of the meat continues. When the temperature of the oven is reduced to a value corresponding to the desired degree of doneness, the thermostat 14 maintains the oven and the roast at this temperature value so that constant attention to the meat until serving is obviated. The temperature of the interior of the roast, at which the initial high temperature cooking period is terminated and the cooking period of receding heat is initiated, is manually adjustable, conjointly, by the desired degree of doneness and the weight of the roast, so that uniform doneness is obtained regardless of the weight of the meat to be treated. The adjustment for weight is readily and accurately carried out, as the weight of the meat is usually learned at the time of purchase. Separate thermostatic switches are disclosed herein for the sake of clearness but it will be understood that a single thermostatic structure having switching means selectively activated to provide the high roasting and lower doneness temperatures may be employed. It is believed apparent that the various control elements which are exterior of the oven being controlled may be combined as a unitary control device for mounting in any convenient location on the range.

What is claimed is:

1. The combination with a cooking oven adapted for roasting meat and a heater therefore, of a control mechanism including first and second thermostatically operated switching means responsive to the temperature of the air within the oven for controlling energization of said heater, said first thermostatically operated switching means being adjustable to provide relatively high roasting temperatures within the oven, manually adjustable means for said second thermostatically operated switching means to provide lower sustained temperatures corresponding to the degree of doneness of the meat, means for selectively activating the first and second thermostatically operated switching means and including a probe insertable in the meat being heated and responsive to the temperature of an inner region of the meat, said activating means selectively rendering the first thermostatically operated switching means active when the temperature of the probe is below a predetermined value and the second thermostatically operated switching means active when the temperature of the probe attains said value, and manually operated means for actuating said adjusting means for the second thermostatically operated switching means and for varying said temperature of the probe at which the second thermostatically operated switching means is rendered active.

2. The combination with an oven adapted for roasting meat and a heater for the oven, of a control for the heater including means responsive to the temperature of the oven for controlling energization of the heater, means including a probe insertable in the meat being roasted and responding to the temperature of an inner region of the meat for modifying operation of the oven temperature responsive means, said modifying means providing for high temperature operation of the oven when the temperature of the probe is below a predetermined value and lower temperature operation of the oven when the temperature of the probe attains said predetermined value, means for adjusting the predetermined temperature of the probe at which the modifying means is actuated, to determine the degree of doneness of the meat, and means for compensating the adjustment of the modifying means in accordance with the weight of the meat being roasted.

3. The combination with an oven adapted for roasting meat and a heater for the oven, of a control mechanism for the heater including first and second thermostatically operated switching means responsive to the temperature within the oven for controlling energization of the heater, said first thermostatically operated switching means providing relatively high roasting temperatures within the oven, means for adjusting the second thermostatically operated switching means to provide lower mean oven temperatures corresponding to the degree of doneness of the meat, activating means, including a probe insertable in the meat being roasted and responsive to the temperature of an inner region of the meat, for selectively rendering the first thermostatically operated switching means active when the temperature of the probe is below a predetermined value and the second thermostatically operated switching means active when the temperature of the probe is elevated to said value, manually operated means for actuating the adjusting means of the second thermostatically operated switching means and for varying the temperature of the probe at which the second thermostatically operated switching means is rendered active and a manually adjustable device, movable to a plurality of stations corresponding to the weight of the meat being roasted, for compensating the temperature of the probe, selected by the manually operated actuating means, in accordance with the weight of the meat.

4. The combination with an oven adapted for roasting meat and a heater for the oven, of a control mechanism for the heater including first and second thermostatically operated switching means responsive to the temperature within the oven for controlling energization of the heater, said first thermostatically operated switching means being adjustable to provide relatively high roasting temperatures within the oven, manually operated means for adjusting the second thermostatically operated switching means to provide lower mean oven temperatures corresponding to the degree of doneness of the meat, a relay for selectively activating the first and second thermostatically operated switching means, a switch having relatively movable first and second contacts controlling the relay, means for actuating said first contact toward the second contact and including a heat responsive member and a control heater therefor, a probe for insertion in the meat being heated and a resistor in the probe controlling energization of the control heater in response to the temperature of the meat, means actuated by said manually operated means for positioning said second contact and a compensating mechanism for adjusting said second contact in accordance with the weight of the meat being roasted.

5. Control mechanism for an oven adapted for roasting meat and having a heater, said control mechanism including first and second thermostatically operated switching means responsive to the temperature within the oven for controlling energization of the heater, said first thermostatically operated switching means being adjustable to provide relatively high roasting temperatures within the oven, manually operated means for adjusting the second thermostatically operated switching means to provide lower mean oven temperatures corresponding to the degree of doneness of the meat, a relay for selectively activating the first and second thermostatically operated switching means, a switch having relatively movable first and second contacts controlling the relay, means for actuating said first contact toward the second contact and including a heat responsive member and a control heater therefor, a probe for insertion in the meat being roasted and a resistor in the probe controlling energization of the control heater in response to the temperature of the meat, an elongated spring arm supporting said second contact at one end and having its other end fixed, a cam actuated by said manually operated means and engaging one side of said arm for positioning the second contact, a second cam engaging the other side of said spring arm and spaced from the first cam for compensating the positioning of the second contact, and a manually operated handle for actuating the second cam at will in accordance with the weight of the meat being roasted.

6. A control mechanism for the heater of an oven adapted for roasting meat, said control mechanism comprising thermostatically-operated switching means responsive to temperature within the oven for controlling energization of the heater, said thermostatically-operated switching means providing selectively a first range of relatively high roasting temperatures within the oven and a second range of lower roasting temperatures within the oven corresponding to the degree of doneness of the meat, manually-operable means for adjusting said thermostatically-operated switching means within said second range to provide the desired degree of doneness temperature, means for activating said thermostatically-operated switching means selectively in its first and second temperature ranges, control means for the activating means including a heat-responsive member and a control heater therefor, a probe for insertion in the meat being heated and a device in said probe controlling energization of said control heater in response to the internal temperature of the meat, and mechanism for adjusting said control means to compensate for variations in the weight of the meat being heated.

7. A control mechanism for the heater of an oven adapted for roasting meat, said control mechanism comprising thermostatically-operated switching means responsive to temperature within the oven for controlling energization of the heater, said thermostatically-operated switching means providing selectively a first range of relatively high roasting temperatures within the oven and a second range of lower roasting temperatures within the oven corresponding to the degree of doneness of the meat, manually-operable means for adjusting said thermostatically-operated switching means within said second range to provide the desired degree of doneness temperature, means for activating said thermostatically-operated switching means selectively in its first and second temperature ranges, control means for the activating means including a heat-responsive member and a control heater therefor, a probe for insertion in the meat being heated and a resistor in said probe controlling energization of said control heater in response to the internal temperature of the meat, means actuated by the manually-operable adjusting means for adjusting said control means in accordance with the selected degree of doneness temperature, and mechanism for adjusting said control means to compensate for variations in the weight of the meat being heated.

8. A control mechanism for the heater of an oven adapted for roasting meat, said control mechanism comprising thermostatically-operated switching means responsive to temperature within the oven for controlling energization of the heater, said thermostatically-operated switching means providing selectively a first range of relatively high roasting temperatures within the oven and a second range of lower roasting temperatures within the oven corresponding to the degree of doneness of the meat, manually-operated means for adjusting said thermostatically-operated switching means within said second range to provide the desired degree of doneness temperature, means for activating said thermostatically-operated switching means selectively in its first and second temperature ranges, a switch having relatively movable first and second contacts controlling the activating means, means for actuating said first contact toward said second contact and including a heat responsive member and a control heater therefor, a probe for insertion in the meat being heated and a device in said probe controlling energization of said control heater in response to the temperature of the meat, and compensating mechanism for adjusting said second contact in accordance with the weight of the meat being heated.

9. A control mechanism for the heater of an oven adapted for roasting meat, said control mechanism comprising thermostatically-operated switching means responsive to temperature within the oven for controlling energization of the heater, said thermostatically-operated switching means providing selectively a first range of relatively high roasting temperatures within the oven and a second range of lower roasting temperatures within the oven corresponding to the degree of doneness of the meat, manually-operable means for adjusting said thermostatically-operated switching means within said second range to provide the desired degree of doneness temperature, means for activating said thermostatically-operated switching means selectively in its first and second temperature ranges, a switch having relatively movable first and second contacts controlling the activating means, means for actuating said first contact toward said second contact and including a heat responsive member and a control heater therefor, a probe for insertion in the meat being heated and a resistor in said probe controlling energization of said control heater in response to the temperature of the meat, means actuated by said manually-operable means for positioning said second contact, and mechanism for adjusting said second contact to compensate for variations in the weight of the meat being heated.

References Cited in the file of this patent

UNITED STATES PATENTS

| | | |
|---|---|---|
| 2,046,718 | Bletz | July 7, 1936 |
| 2,140,479 | Myers et al. | Dec. 13, 1938 |
| 2,273,734 | Pearce | Feb. 17, 1942 |
| 2,510,526 | Smith | June 6, 1950 |
| 2,820,130 | Dadson | Jan. 14, 1958 |